US010197404B2

(12) United States Patent
Dorum et al.

(10) Patent No.: US 10,197,404 B2
(45) Date of Patent: Feb. 5, 2019

(54) PATH CURVE CONFIDENCE FACTORS

(71) Applicant: HERE Global B.V., Eindhoven (NL)

(72) Inventors: Ole Henry Dorum, Chicago, IL (US); James D. Lynch, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/244,480

(22) Filed: Aug. 23, 2016

(65) Prior Publication Data

US 2016/0356609 A1 Dec. 8, 2016

Related U.S. Application Data

(63) Continuation of application No. 13/769,985, filed on Feb. 19, 2013, now Pat. No. 9,423,261.

(51) Int. Cl.
*G01C 21/32* (2006.01)
*G01C 21/34* (2006.01)

(52) U.S. Cl.
CPC ............ *G01C 21/32* (2013.01); *G01C 21/34* (2013.01)

(58) Field of Classification Search
None
See application file for complete search history.

(56) References Cited

U.S. PATENT DOCUMENTS

| 6,415,226 | B1 | 7/2002 | Kozak |
| 6,560,531 | B1 * | 5/2003 | Joshi ...................... G01C 21/30 340/988 |
| 7,805,442 | B1 | 9/2010 | Joshi et al. |
| 9,423,260 | B2 * | 8/2016 | Stahlin ................... G01C 21/28 |
| 2004/0189633 | A1 * | 9/2004 | Sederberg .............. G06F 17/50 345/418 |

(Continued)

FOREIGN PATENT DOCUMENTS

| DE | 102008012697 | * | 6/2009 | ............ G01C 21/34 |
| DE | 102008012697 A1 | | 6/2009 | |

(Continued)

OTHER PUBLICATIONS

International Search Report and Written Opinion in PCT/EP2014/052789, dated May 30, 2014.

(Continued)

*Primary Examiner* — Mussa A Shaawat
*Assistant Examiner* — Abdhesh K Jha
(74) *Attorney, Agent, or Firm* — Lempia Summerfield Katz LLC

(57) ABSTRACT

In one embodiment, navigational features of a navigation device are activated or deactivated according to the accuracy of the geographic data. The navigation features may be predictive features related to upcoming portions of a path curve. The path curve is compared to measured data. For example, a first curve is accessed from a map database and a second curve is based on measured position data collected while traversing the path. The first curve and the second curve correspond to the same geographic area. A difference of an attribute between a section of the first curve and a section of the second curve is used to assign a confidence factor to the section of the first polycurve based on the difference. The attribute may be heading, position, curvature, or another aspect of the path curves.

18 Claims, 8 Drawing Sheets

(56) References Cited

U.S. PATENT DOCUMENTS

| | | | |
|---|---|---|---|
| 2007/0271036 A1* | 11/2007 | Atarashi | G01C 21/32 701/446 |
| 2008/0010009 A1* | 1/2008 | Miyoshi | G01C 21/30 701/438 |
| 2010/0082248 A1 | 4/2010 | Dorum et al. | |
| 2010/0082307 A1 | 4/2010 | Dorum et al. | |
| 2010/0121518 A1* | 5/2010 | Tiernan | G01C 21/165 701/26 |
| 2010/0161219 A1* | 6/2010 | Lo | G01C 21/32 701/532 |
| 2010/0241354 A1* | 9/2010 | Stahlin | B60W 40/02 701/532 |
| 2011/0125811 A1 | 5/2011 | Witmer | |
| 2011/0178689 A1 | 7/2011 | Yasui | |
| 2012/0095682 A1 | 4/2012 | Wilson | |

FOREIGN PATENT DOCUMENTS

| | | |
|---|---|---|
| EP | 1225424 A3 | 2/2004 |
| EP | 1927822 A1 | 6/2008 |
| EP | 1498694 B1 | 1/2012 |
| EP | 2172748 B1 | 11/2014 |

OTHER PUBLICATIONS

James Biagioni et al., "Inferring Road Maps from GPS Traces: Survey and Comparative Evaluation", University of Illinois Chicago, Nov. 15, 2011.

PCT International Search Report and Written Opinion of the International Searching Authority dated Aug. 25, 2015 for corresponding PCT/EP2014/052789.

Schroedl, Stefan, et al. "Mining GPS traces for map refinement." Data mining and knowledge Discovery 9.1 (2004): 59-87.

Tong, Daoqin, Carolyn J. Merry, and Benjamin Coifman. "Traffic information deriving using GPS probe vehicle data integrated with GIS." Center for Urban and Regional Analysis and Department of Geography. The Ohio State University. Ohio, USA.[Links] (2005).

European Office Action for related European Application No. 14 704 151.1-1557 dated Mar. 31, 2017.

* cited by examiner

PATH CURVE CONFIDENCE FACTORS

This application is a continuation application under 37 C.F.R. § 1.53(b) and 35 U.S.C. § 120 of U.S. patent application Ser. No. 13/769,985 filed Feb. 19, 2013, the disclosure of which is incorporated herein by reference in its entirety.

FIELD

The following disclosure relates to determining reliability of navigable geographic paths, or more particularly, to enabling navigation features based on reliability.

BACKGROUND

Computer based maps of geographic areas include data representative of navigable paths (e.g., roads, streets, walkways), intersections, points of interest and other features. The navigable paths may be represented by discrete data points. A discrete data point may be a coordinate pair (latitude and longitude) or triple (latitude, longitude, and altitude). However, the discrete data points provide only an estimate of the navigable path. The exact location of the navigable path between discrete data points may not be included. Instead, the navigable paths are approximated to form a path curve.

The path curve may deviate from the actual navigable path. Further, the collection of path curves in a database may vary because the path curves are generated from different techniques. Some path curves may be derived from historical maps and surveys. Some path curves may be traced from aerial or satellite photographs. Some path curves may be manually generated by a person using a computer. Different cartographers may select different end points, nodes, and shape points for generating a path curve by computer. These variations in path curve generation lead to inconsistent accuracies in the database.

SUMMARY

In one embodiment, features of a navigation device are activated or deactivated according to the accuracy of the geographic data. The features may include driving assistance features. The navigation features may be predictive features related to upcoming portions of a path curve. The path curve is compared to measured data. For example, a first curve is accessed from a map database and a second curve is based on measured position data collected while traversing the path. The first curve and the second curve correspond to the same geographic area. A difference of an attribute between a section of the first curve and a section of the second curve is used to assign a confidence factor to the section of the first polycurve based on the difference. The attribute may be heading, position, curvature, or another aspect of the path curves.

BRIEF DESCRIPTION OF THE DRAWINGS

Exemplary embodiments of the present invention are described herein with reference to the following drawings.

DETAILED DESCRIPTION

Figure 1:
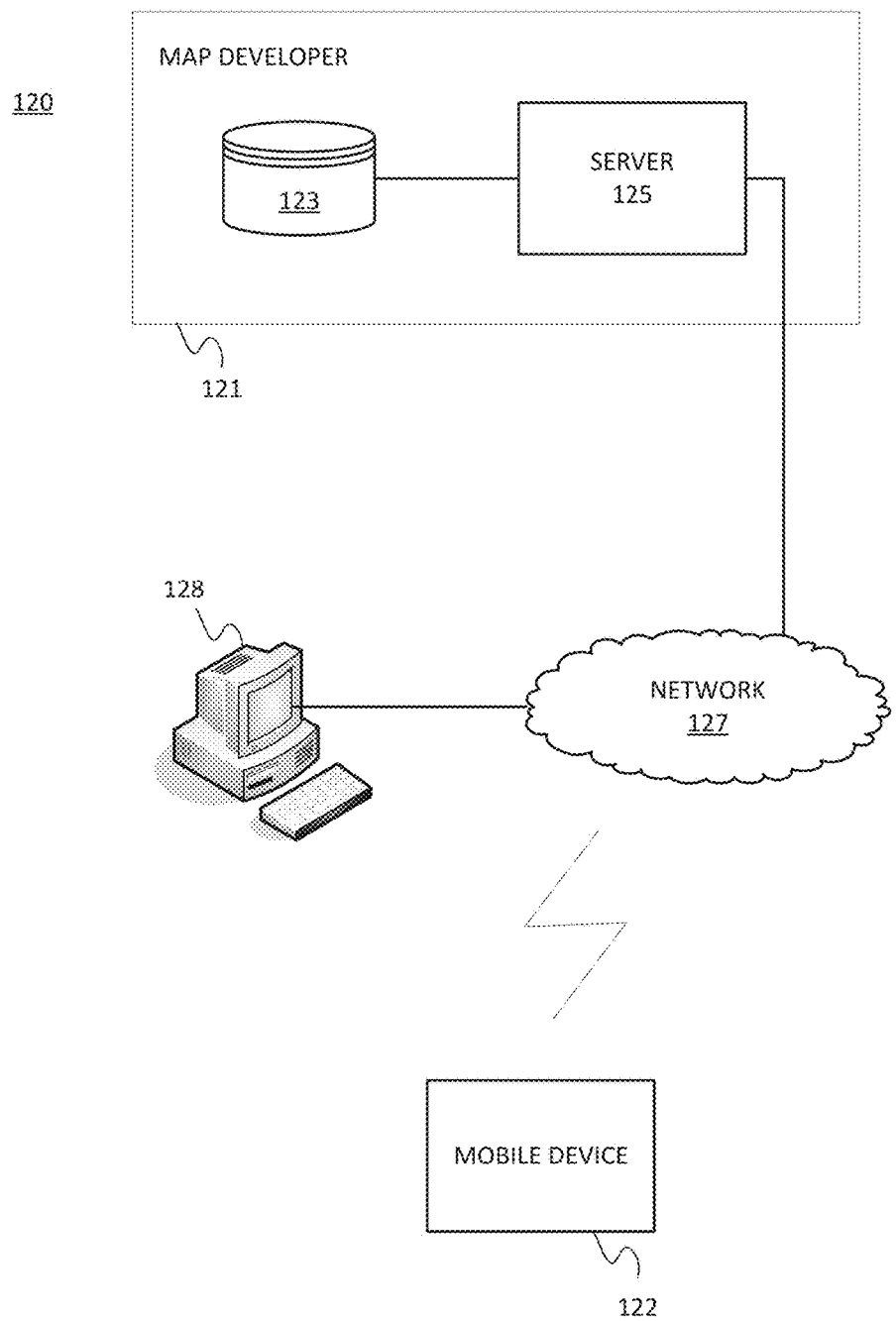
FIG. 1 illustrates an example system for deriving path curve confidence factors.

Path curves (e.g., polynomials or splines) for representing paths in a map database may have inaccuracies. The following embodiments assess the errors in path curves. The errors may be position deviations, curvature deviations, or heading deviations with respect to the actual position, curvature, or heading of the real world path as measured by sensors in a positioning device. In one example, the measured data is collected from one or more positioning devices and aggregated for analysis. In another example, the measured data is collected and analyzed while the positioning device travels along the path. The path may be a road, street, or walkway. The assessed errors may be described in confidence factors associated with various portions of the path curve. The confidence factors indicate the reliability of the path curve. A navigation device may place limits on certain navigation features so some navigational features are offered only when the current portion of the path curve meets a reliability or confidence threshold.

One example system having accuracy requirements for path curves is an advanced driving assistance system (ADAS). An ADAS provides driving assistance features to a user. Driving assistance features are examples of navigational features. The driving assistance features may include lane departure warnings, lane change assistance, collision avoidance, intelligent speed adaption, adaptive light control, or other features. Driving assistance features may be less effective when the path curves used to supply data to the driving assistance features are unreliable. The ADAS may be configured to offer certain driving assistance features when a confidence factor for the path curve that corresponds to a current location of the vehicle meets or exceeds a minimum threshold level.

The path curves in a geographic database may be generated from two-dimensional link geometry. The link geometry includes line segments that connect a series of points. In one example, map data in the geographic database includes paths only in the form of straight line segments. The links are used to fit a path curve by estimating the link geometry may be polynomials, spline curves, b-spline curves, bezier curves, clothoids, or other parametric or non-parametric curve types. The path curve may be two-dimensional (e.g., latitude and longitude), three-dimensional (e.g., latitude, longitude, and height) or have another number of dimensions.

Polynomial interpolation or approximation techniques, such as a non-uniform rational B-spline (NURBS) interpolation or approximation may be used to generate the path curve from the road geometry. Calculus of Variations may also be used to impose shape constraints of the curve shape in between the constraints. While this process may be performed by a computer and include automated aspects, design considerations and/or manual intervention may affect the resulting path curve. Control point locations, weighting factors for control points, knot point location, and knot point intervals may vary between users and between interpolation software techniques. Further, geographic databases cover vast areas and combine data from multiple sources. For example, some road geometry may be collected through field vehicles, some road geometry may be collected through satellite or aerial images, and other road geometry may be derived from surveyed maps. Because of these variables, the accuracy of the path curves in a map database may vary from path to path or even along the same path.

The geometric database path ADAS curves are compared to path curves derived from data measured from driving or otherwise traversing the path. The measured path curves may be collected by field vehicles or probe vehicles. The data may be measured with sensors, such as a global positioning system (GPS) or another satellite based positioning. The sensors may be inertial sensors (e.g., accelerometer and/or gyroscopes). The sensors may be a magnetometer. A measured path curve is derived from the measured data and compared to the path curve from the database. The path curves may be compared with respect to position, curvature, heading, or other attributes. The following embodiments calculate confidence factors for portions of the path curves based on one or more of these comparisons.

FIG. 1 illustrates an exemplary system 120. The system 120 includes a map developer system 121, a mobile device 122, a workstation 128, and a network 127. Additional, different, or fewer components may be provided. For example, many mobile devices 122 and/or workstations 128 connect with the network 127. The developer system 121 includes a server 125 and a database 123. The mobile device 122 may also include a compiled ADAS navigation database, which may be stored on physical media. The developer system 121 may include computer systems and networks of a system operator (e.g., NAVTEQ or Nokia Corp.).

Figure 2A:
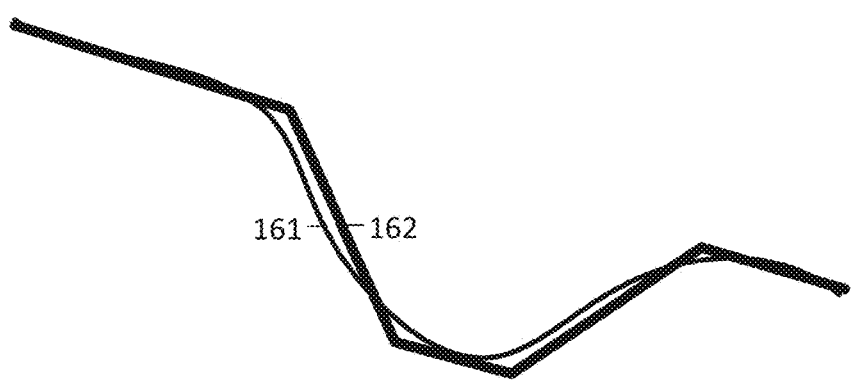
FIG. 2A illustrates an example path curve.

The database 123 may be a map database or a geographic database configured to store path curves as splines, bezier curves, clothoids, or piecewise polynomials, to represent navigable paths. The preceding examples may be referred to as polycurves. FIG. 2A illustrates an example polycurve 161 defined by link segments 162. A polycurve is defined as a curve continuous over a length. The curvature of the polycurve is variable over the length of the polycurve. One section of the polycurve has a different curvature than another section of the polycurve. The polycurve may include a plurality of intervals each associated with a curvature value. In other embodiments, the same curvature is provided throughout a section of the path curve.

A bezier curve is a parametric curve. For example, the bezier curve may be defined according to one equation in one axis and another equation in another axis. The equations are functions of a single parametric variable. A B-spline is a generalization of a bezier curve. The B-spline is defined according to control points and knots.

A clothoid is a curve with linearly varying curvature. The curvature of the clothoid may be a function of the position along the clothoids. For example, the curvature of the clothoids may be proportional to a corresponding length of the clothoid. The curvature of the clothoid may begin with zero at a straight section and increase linearly with curve length. A piecewise polynomial is defined by multiple polynomial equations. Each of the polynomial equations defines a different section of the piecewise polynomial. The sections of the piecewise polynomial may be defined by endpoints (e.g., knot points) or a parametric variable.

In one example, a spline curve is a composite curve formed with piecewise polynomial functions representing the curve section. The points where the polynomial functions piece together are referred to as knots, and the points on the line segments that define the shape of the spline are control points. There are many types of spline curves. Spline curves with evenly spaced knot points are uniform spline curves, and spline curve with irregularly spaced knot points are non-uniform spline curves.

The path curve may be associated in the database 123 with a geographic location or multiple locations. The path curve may be associated with a starting point and an endpoint or series of points along the path curve. Alternatively, the path curve may be defined in the database 123 by listing the control points and/or knot points.

The mobile device 122 calculates position data for the mobile device 122 as the mobile device 122 travels along the path. The position data may be calculated by a satellite-based positioning system, an inertial measurement unit (IMU) or both. Either of which or both may be referred to as a positioning unit. The mobile device 122 transmits the position to the server 125. The server 125 is configured to access one of the stored path curves according to the position data for the mobile device 122.

The same position data or subsequent position data is used to generate a measured path curve. The server 125 is configured to generate the measured path curve based on measured position data collected while the mobile device 122 traverses the path or after a set of the measured position data has been collected. The server 125 performs map matching to associate the measured path curve with at least a portion of a previously stored path curve based on link geometry from the map database. The map matching may be based on position only. Alternatively, the map matching may be supplemented using heading data and/or shape data.

The server 125 may be configured to perform an initial comparison of the measured path curve and the previously stored path curve. The server 125 identifies sections along the drive that deviate greatly from the previously stored path curve. For example, the server 125 may compare position and/or heading of the measured path curve to corresponding portions of the previously stored path curve. The server 125 may calculate differences between the positions or headings as a correlation value and compare the differences to a correlation threshold. The correlation value may be a rough estimate of the differences between the path curves. The correlation threshold may be relatively high because the initial comparison is designed to eliminate drastic differences. The differences may occur when the vehicle leaves the traveled path (i.e., stopping at a gas station or restaurant). In response to the initial comparison, the server 125 identifies sections of the measured path curve that are consistent with respect to the link geometry. The consistent sections are included in a detailed comparison described below and the inconsistent sections are excluded. The inconsistent sections may also be reported to the map developer 121.

The server 125 is configured to fit or align the measured path curve to corresponding portions of the previously stored path curve in order to compare appropriate sections of the path curves. The server 125 may be configured to perform a regression operation or other mathematical technique to ensure the best fit between the measured path curve and the stored path curve. The best fit minimizes any differences between the measured path curve and the stored path curve.

The server 125 is configured to calculate a relative difference between at least a section of the stored path curve and a geographically corresponding section of the measured path curve. The relative difference may be computed at intervals or predetermined distances (e.g., 1 meter, 2 meter, or 10 meters) along the curves. The relative differences may be computed at each section of the path curve. The sections may be defined according to a change in curvature for one or both of the path curves. The sections may be defined and extend between knot points. The entire curve may be used rather than a section.

Equation 1 is an example calculation for the relative difference or relative error (RE) using an attribute in the previously stored path curve ($A_1$) and the attribute in the measured path curve ($A_2$). The relative difference may be calculated for any attribute of the path curves. Example attributes include position, curvature, and heading. Other attributes may be used. As an alternative to relative error, absolute error may be used.

$$RE=(A_1-A_2)/A_2 \qquad \text{Eq. 1}$$

Figure 2B:
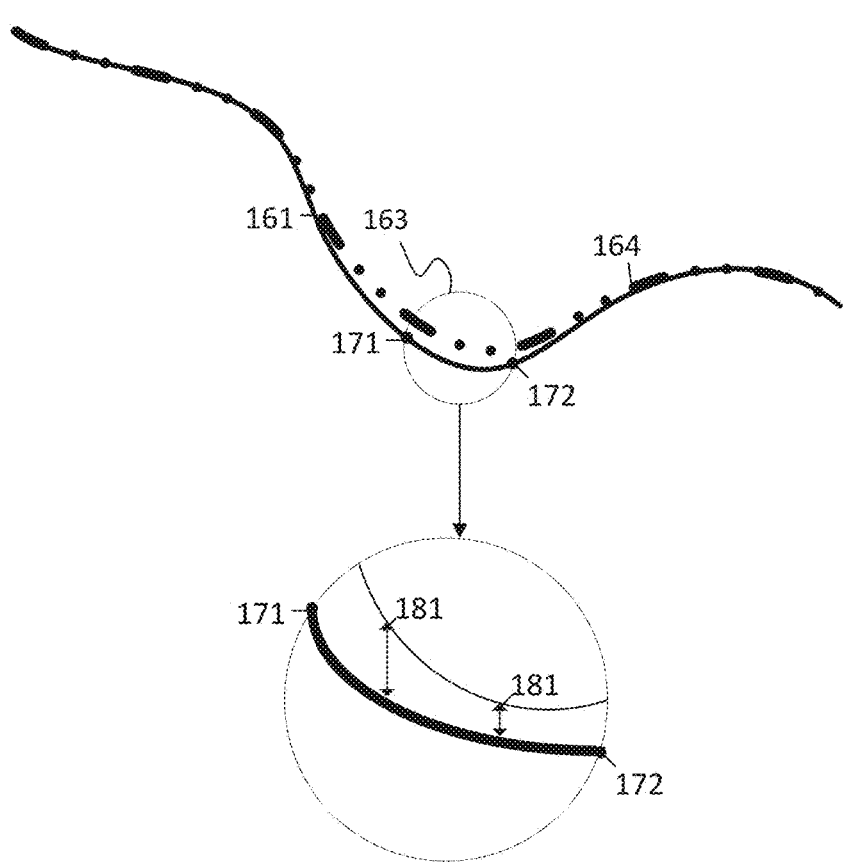
FIG. 2B illustrates an example path curve position comparison.

FIG. 2B illustrates an example path curve position comparison of the previously stored path curve 161 and the measured path curve 164. The path curves are compared at a specific section illustrated by circle 163 and bounded by a starting point 171 and an ending point 172. The distance comparison calculates a difference in the position of the path curves in a vertical direction, a horizontal direction, or both. A shortest path difference between two corresponding points on the path curves may be used. The example shown includes differences 181 calculated in the vertical direction. The differences 181 may vary along the section of the path curve. The server 125 may be configured to average the differences to calculate one difference per section of the path curve.

Figure 3A:
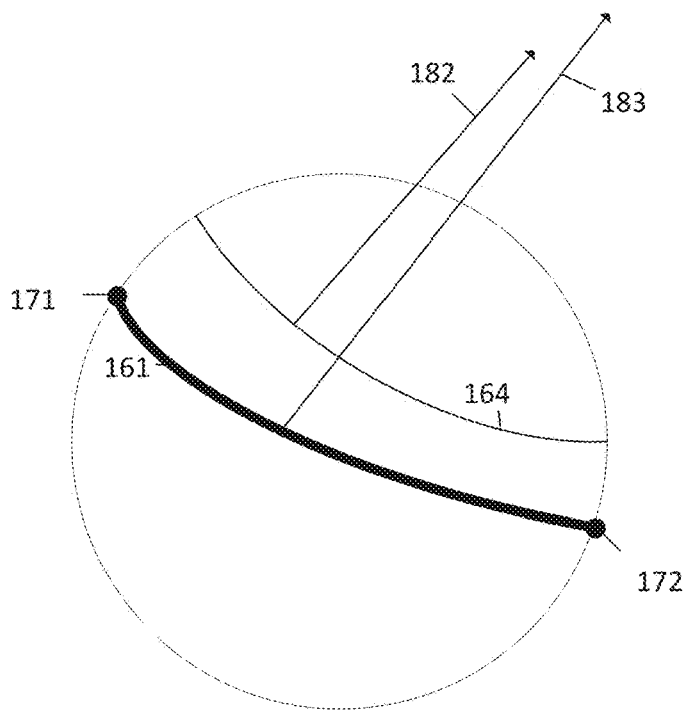
FIG. 3A illustrates an example path curve curvature comparison.

FIG. 3A illustrates an example path curve curvature comparison of the previously stored path curve 161 and the measured path curve 164. The curvature may be a numerical value based on a radius of a theoretical circle having the same shape as the path curve in that particular section. The curvature may be an inverse of the radius of the theoretical circle. The curvature may be assigned a sign (positive or negative) depending on the direction of the path curve. Vector 182 represents the curvature of the measured path curve 164, and vector 183 represents the curvature of the previously stored path curve 161. The vector 182 may be perpendicular to the measured path curve 164, and the vector 183 may be perpendicular to the stored path curve 161. The vector 182 may be a unit normal vector scaled by the curvature. The vector 182 may be assigned a sign or polarity depending on which side of the path curve the vector 182 points. The server 125 may be configured to compute a difference in the lengths or absolute values of vectors 183 and 184. The relative error of curvature may be calculated using Equation 1 for each section in the curve paths.

The server 125 may be configured to perform an exclusion process for curvature calculations. For substantially straight sections of the path, changes in curvature are less relevant. The calculations for the relative error of curvature in straight sections of the path may be omitted. For example, the server 125 may be configured to compare the curvature of the previously stored path curve 161 and the measured path curve 164 or both to a minimum curvature threshold. Examples for the maximum curvature threshold include 1/1000 meters, 1/500 meters, or 1/5000 meters. In addition or in the alternative, zero-crossing areas may be avoided using the minimum curvature threshold. Zero-crossing areas are excluded because small misalignments in these areas cause large false positives relative curvature errors when the two path curves actually have very similar shapes.

Figure 3B:
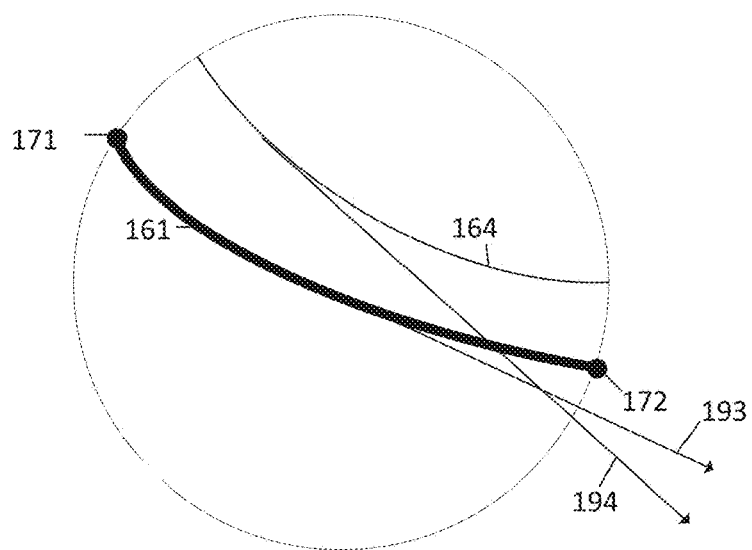
FIG. 3B illustrates an example path curve heading comparison.

FIG. 3B illustrates an example path curve heading comparison of the previously stored path curve 161 and the measured path curve 164. The heading may correspond to an angle representing an orientation or direction of the mobile device 122 and/or the path. Vector 193 represented a heading of the measured path curve 164, and vector 194 represents a heading of the previously stored path curve 161. The headings may be calculated as tangent lines to the path curves. The server 125 may be configured to compute a difference angles, or absolute values or magnitudes of vectors 193 and 194. The relative error of heading may be calculated using Equation 1.

Figure 4:
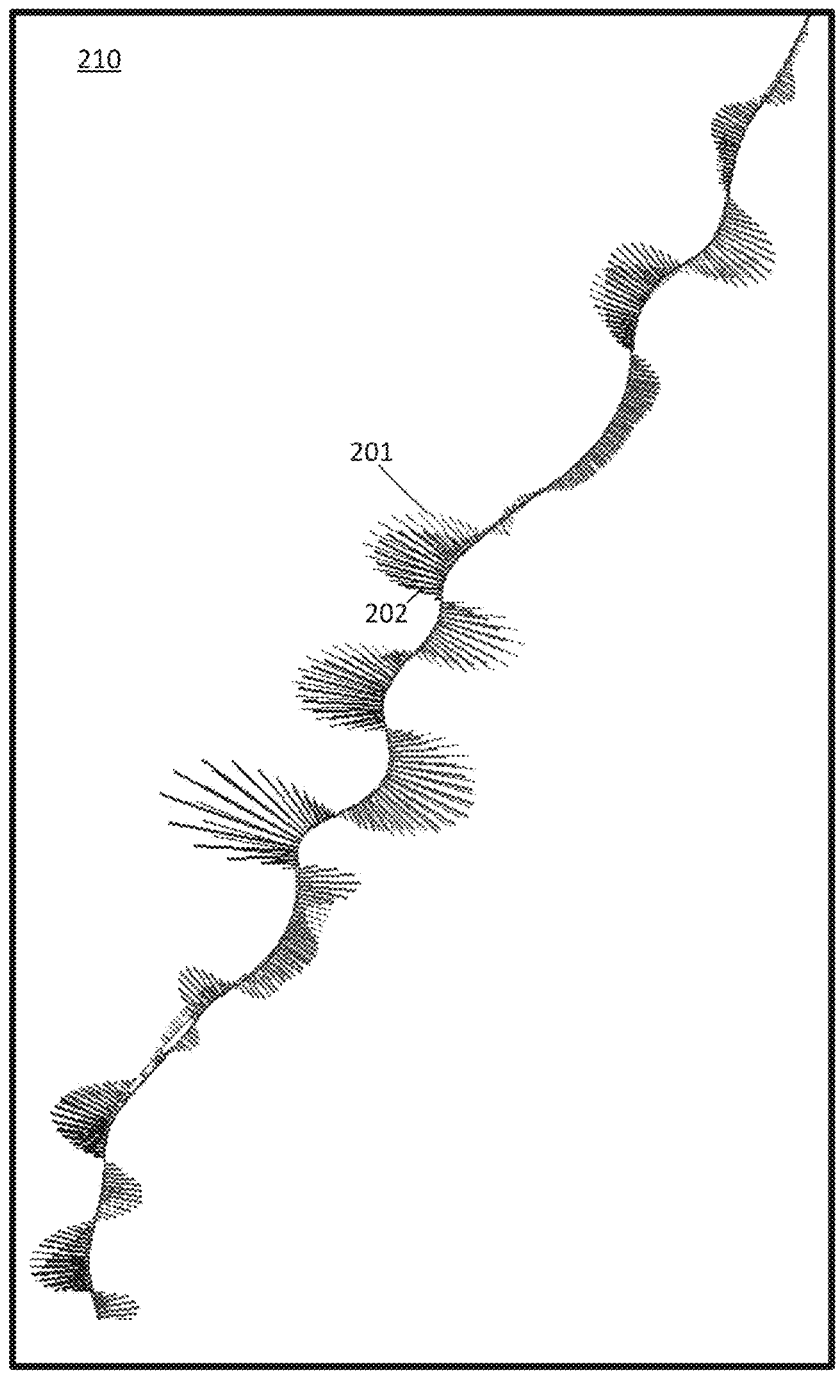
FIG. 4 illustrates another example path curve curvature comparison.
Figure 5:
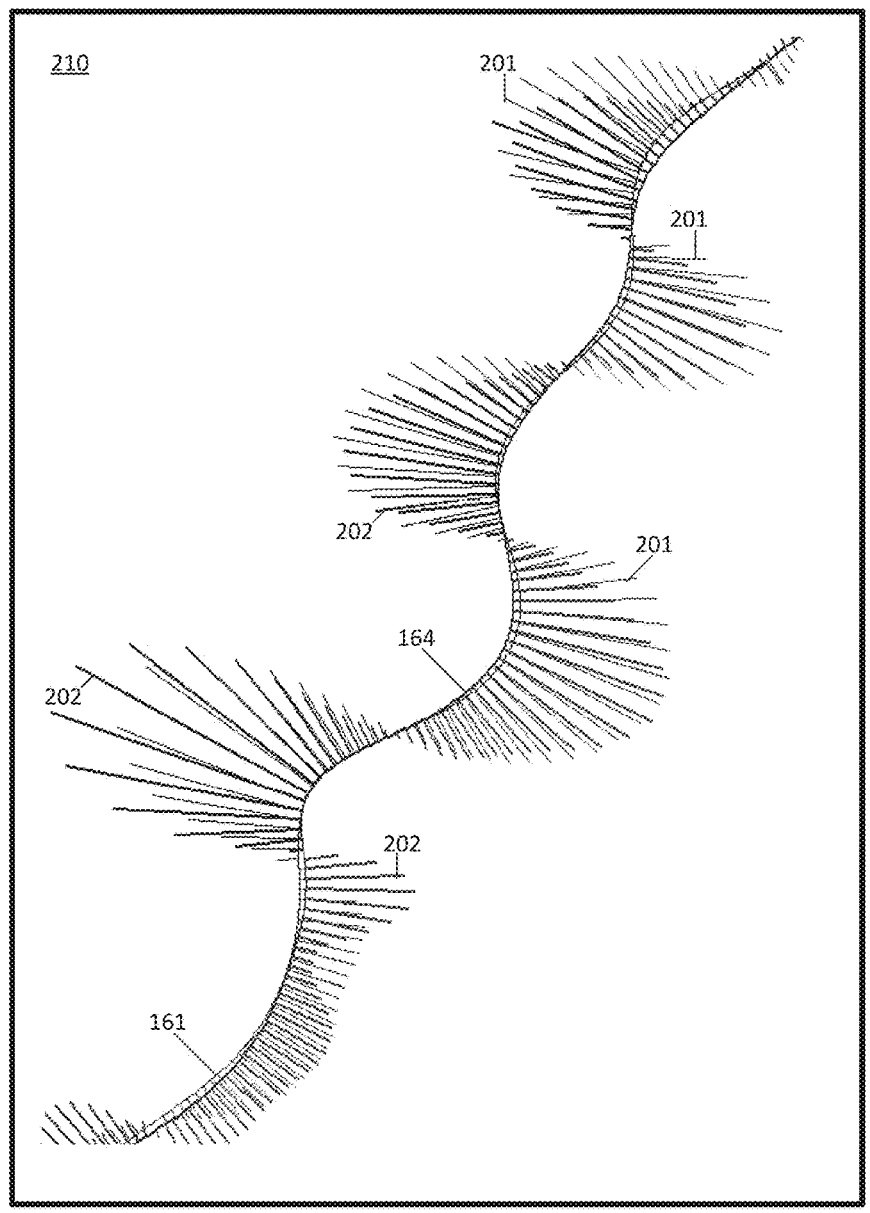
FIG. 5 illustrates a more detailed representation of the example of FIG. 4.

FIGS. 4 and 5 illustrate a graphical representation 201 of an example path curve curvature comparison. The previously stored path curve 161, which may be an ADAS spline, and the measured path curve 164, which may be a GPS/IMU spline, are shown in map form. Slight variations in curvature are visible. To further illustrate the variations, the server 125 calculates a first porcupine 201 for the stored path curve 161 and a second porcupine 202 for the measured path curve 164. The first porcupine is illustrated with thin lines and the second porcupine is illustrated with thick lines. Each spike of the porcupine has a length determined by the curvature of the path curve at the corresponding section. The spike length may be proportions to curvature or inversely proportional to curvature. The differences in spike length graphically represent the difference between curvatures, so may represent the confidence factor for curvature for the corresponding segments of the path curves.

The server 125 is configured to assign a confidence factor to each section of the previously stored path curve 161 based on the relative difference in one or more of the attributes. The relative difference may be stored in the database 123, and may be added to a vector including the previously stored path curve 161. The confidence factors may be calculated statistically. For example, the confidence factor may be a confidence interval that the relative difference is negligible. The confidence factors may indicate a range (e.g., high confidence, low confidence, or medium confidence). The ranges may correspond to percentage errors (e.g., 0-10%, 10-30%, 30-50%, or 50-100%). The confidence may indicate a more precise percentage level of confidence (e.g., 10%, 18%, or 92%). The confidence factors (CF) for a curve property can be expressed as the probability (ranging from 0 to 1) that the normally distributed mean relative or absolute mean error ME with standard deviation (a) of the ADAS curve segment with respect to the measured curve lies within an error limit (EL) (e.g. as provided by an ADAS safety application) and may be calculated according to Equation 2.

$$CF = \frac{1}{2} - \frac{1}{2}\text{erf}\left(\frac{EL-ME}{\sigma\sqrt{2}}\right) \qquad \text{Eq. 2}$$

Where efr( ) is the error function (e.g., the Gauss error function). The confidence factor can also be expressed as a percentage as: CF %=100*CF. The individual confidence or certainty factors (i.e. for position, heading and curvature) may be combined two at a time by combining uncertain information based on certainty factor theory as shown in Equation 3.

$$CF_{AB}=CF_A+CF_B(1-CF_A) \qquad \text{Eq. 3}$$

Combining more than two confidence factors may be accomplished by applying Equation 3 repeatedly for each confidence factor to be combined. When confidence factors are combined, the resulting combined confidence factor may no longer express probability.

The server 125 may be configured to deliver the path curve 161 and confidence factors to other map developers. The server 125 may be configured to incorporate the confidence factors in an ADAS. For example, the server 125 may be configured to enable at least one feature of a navigation device (e.g., mobile device 122) based on the confidence factor. The server 125 may generate a message with data indicative of enabling or disabling the feature and transmit the message to the navigation device. The server 125 may compare the confidence factor to a threshold confidence level (e.g., 90%, 95%, or 80%) and select a mode based on the comparison. The server 125 may activate a first mode for a navigation feature if the confidence factor exceeds the threshold confidence level and activate a second mode for the navigation feature if the confidence factor is less than the threshold confidence level. Example navigation features or navigation modes include adaptive headlight aiming, lane departure warning and control, curve warning, speed limit notification, hazard warning, predictive cruise control, adaptive shift control, and other features.

A different threshold confidence level may be used for position, heading, and curvature. The threshold confidence level for the distance comparison may be a function of functional class of the path. Example functional classes include arterial roads, collector roads, and local roads. Each functional classification may be assigned a different threshold for the distance comparison. For example, the threshold for arterial roads is greater than the threshold for collector roads, which is greater than the threshold for local roads. The relative error of position may be calculated using Equation 1.

The mobile device 122 is a smart phone, a mobile phone, a personal digital assistant ("PDA"), a tablet computer, a notebook computer, a personal navigation device ("PND"), a portable navigation device, in-car navigation system with an ADAS safety application, a stand-alone ADAS safety application, and/or any other known or later developed portable or mobile device. The mobile device 122 includes one or more detectors or sensors as a positioning system built or embedded into or within the interior of the mobile device or vehicle 122. The mobile device 122 receives location data from the positioning system.

The optional workstation 128 is a general purpose computer including programming specialized for the following embodiments. For example, the workstation 128 may receive user inputs for defining the confidence ranges, minimum curvature threshold, confidence threshold, and correlation threshold. The workstation 128 may be configured to display the path curves and/or the confidence factors. The workstation 128 includes at least a memory, a processor, and a communication interface. In one embodiment, the workstation 128 is used for navigation where previously acquired measured curves from the mobile device 122 are used for comparison with curves from the developer system 121.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources necessary for calculating confidence intervals for path curves may be divided between the server 125 and the mobile device 122. In some embodiments, the server 125 performs a majority or all of the processing ("server-based embodiments"). In other embodiments, the mobile device 122 or the workstation 128 performs a majority or all of the processing ("endpoint-based embodiments"). In addition, the processing may be divided substantially evenly between the server 125 and the mobile device 122 or workstation 128 ("hybrid embodiments").

Figure 6:
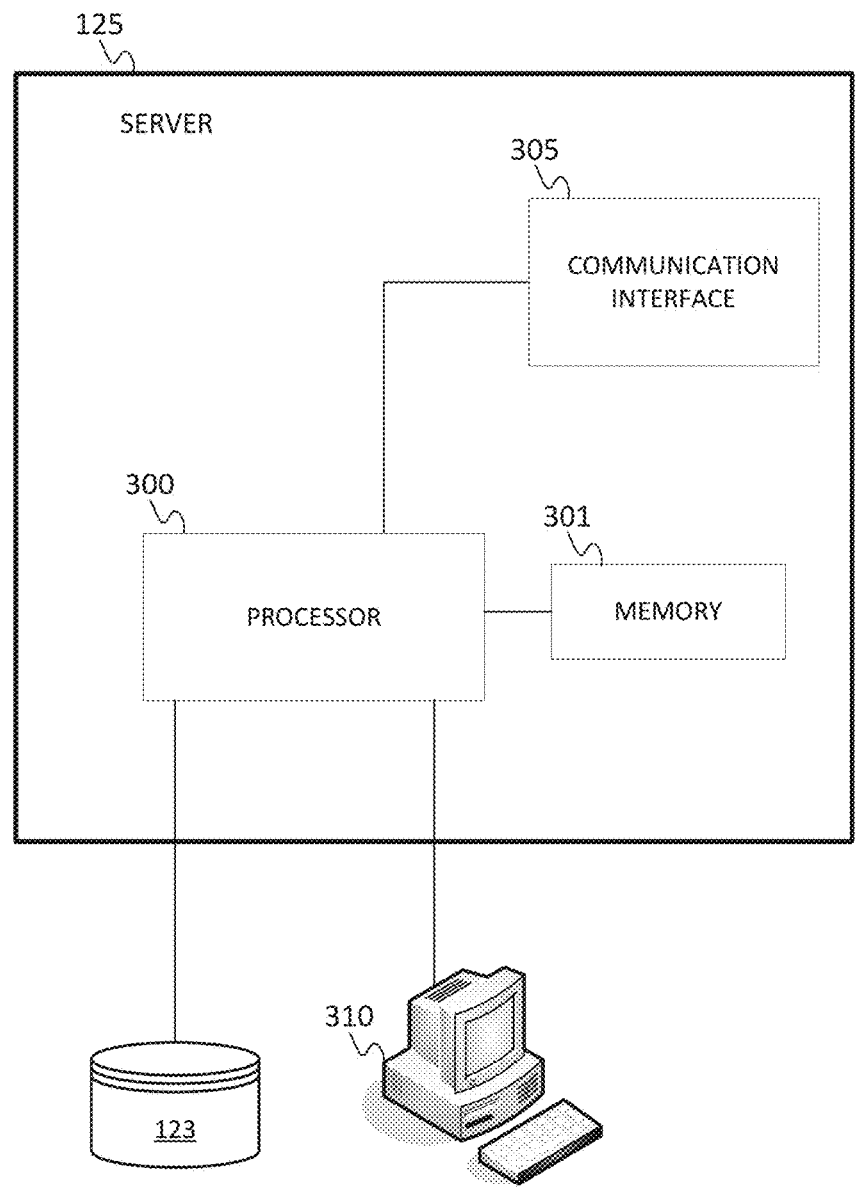
FIG. 6 illustrates an exemplary server of the system of FIG. 1.

FIG. 6 illustrates an exemplary server of the system of FIG. 1. The server 125 is configured to compare existing path curves to measured data in order to generate confidence factors for sections of the path curves. Features of a navigation device may be turned on or off according to the confidence factors. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122.

The memory 301 is configured to store polycurves representing paths in a map database. The paths may be road segments from database 123. The paths may correspond to any navigable path. The paths may be indexed according to geographic location. The controller 300 receives position data from the mobile device 122 and accesses the memory 301 or the database using the position data to retrieve a curve or a section of a curve. The curve approximates one of the paths in the map database. The curve may approximate link geometry of a series of straight line segments. The curve is a twice differentiable curve.

The controller 301 is configured to calculate a confidence factor based on a comparison between a section of the first curve and a section of a second curve. The second curve is derived from measured data collected while traversing the path. The measured data may include data collected by a satellite based position unit incorporated into the mobile device 122, by one or more inertial sensors incorporated into the mobile device 122, or by both. The data may be position data, heading data, or orientation data.

The measured data may take the form of a spline curve (e.g., GPS/IMU spline curve). The spline curve may be adjusted according to lane changes. Lane changes may be detected by monitoring road strips, lane markers, curbs, or another indicator of the edge of the road. One technique for monitoring road edges uses a light detection and ranging (LIDAR) sensor. The LIDAR sensor generates 3D position data in a point cloud, which is analyzed to locate the edge of the road or paint stripes on the road. The sequence of LIDAR points corresponding to paint stripes and road edges may be detected to compute virtual points representing the lane and/or road center on the road surface. Lane departure applications perform image processing to identify the distance on the road surface to left and right paint stripe. This information can be used to offset the GPS/IMU data to lie in the lane and/or road center. Both LIDAR and lane departure applications also indicate when the vehicle changes lanes. During lane changes the shape of the GPS/IMU trace does not follow that of the lane or road center yielding sections of GPS/IMU data not suitable as measurements and may be excluded from the measurements since lane change regions do not reflect the road or lane shape and may exhibit curvature anomalies such as inflection points. When virtual lane or road center points are computed using either technique, lane changes do not cause measurements anomalies. Both LIDAR and lane departure applications require road paint marking with sufficient reflectivity to be detected to perform reliable measurements. Both LIDAR and lane departure applications can detect and indicate when their measurements are affected by paint stripe quality issues or occlusion by surrounding vehicles such that such measurements can be excluded.

The controller 301 may be configured to generate an enablement message for a navigation device based on a comparison of the confidence factor to a threshold level. In one example, when the confidence factor exceeds a confidence threshold, the navigation device is signaled to operate by the enablement message. In another example, when the confidence factor exceeds a confidence threshold, the navigation device is signaled to activate an additional feature of the navigation device. Conversely, when the controller 301 determines that the confidence factor has fallen below a minimum confidence threshold, the controller 301 is configured to disable the navigation device or specific features of the navigation device. As features are enabled or disabled, the navigation device operates in different modes.

Multiple sections of the curve may be analyzed in succession. A confidence factor may be stored for each succession along with the first path curve. Alternatively, the analysis may occur in real time, and a confidence factor for one section of the path curve may be used to determine the reliability of a subsequent section of the path curve. Alternatively, the controller 301 may calculate a running average of confidence factors and determine the reliability of navigation features for a current section based on the running average of confidence factors.

The specific features of the navigation device may include one or more of an adaptive headlight control, lane departure warning and control, curve warning, hazard warning, predictive cruise control, or adaptive shift control. Adaptive headlight control may rotate the headlights to see around curves based on the curvature of the path curve. In addition, the adaptive headlight control may switch high beams and low beams based on the curvature of the path curve. Lane departure warnings are generated when the detected position of the mobile device 122 leaves the current lane. Curve warnings may be displayed when the mobile device 122 is approaching a high curvature section of the path curve. Similarly, hazards warnings are based on other conditions in the upcoming portions of the path curve. Predictive cruise control considers information on the road ahead and adjusts present cruise control speeds accordingly. Adaptive shift control considers information on the road ahead and shifts the transmission up or down a gear as appropriate. Any of these features may be incorporated into a vehicle computer independent from or in place of a navigation device. An ADAS may operate behind the scenes without visibility to the driver.

Figure 7:
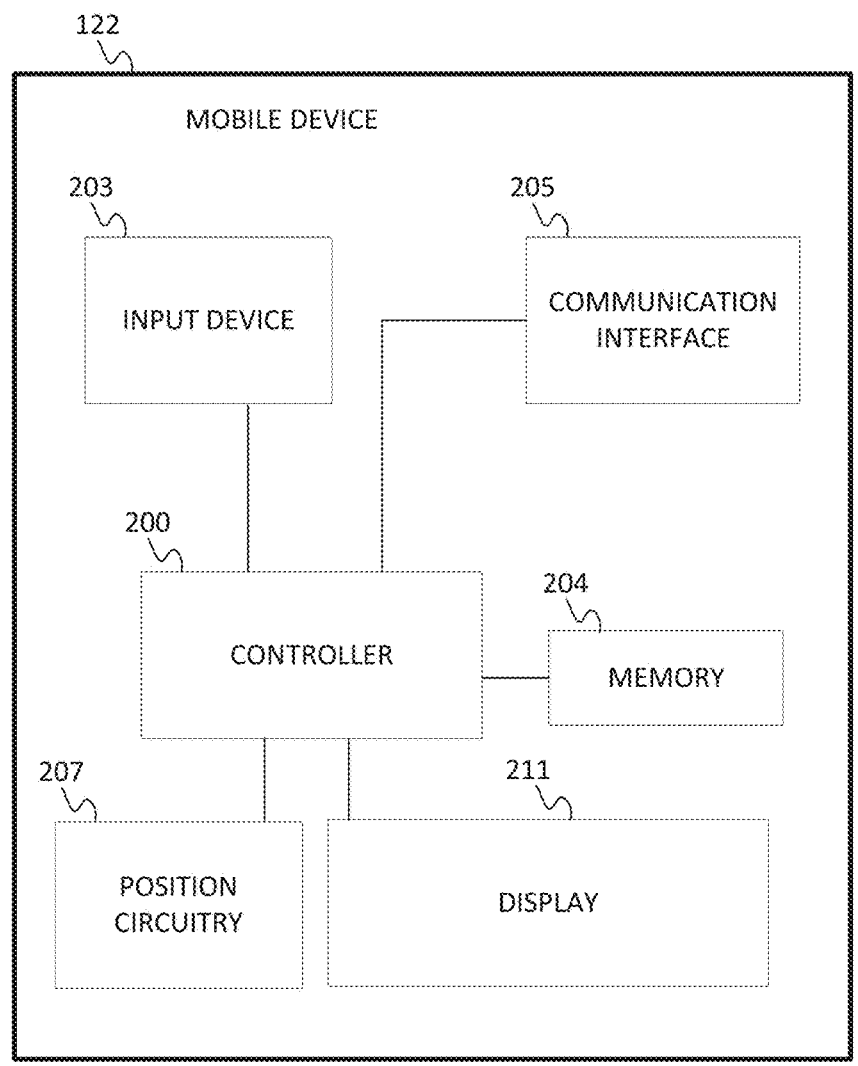
FIG. 7 illustrates an exemplary mobile device of the system of FIG. 1.

FIG. 7 illustrates an exemplary mobile device of the system of FIG. 1. The mobile device 122 may be referred to as a navigation device. The mobile device 122 includes a controller 200, a memory 204, an input device 203, a communication interface 205, position circuitry 207, a camera 209, and a display 211. The workstation 128 may include at least a memory and processor and may be substituted for the mobile device in the following endpoint-based embodiments. In the following endpoint-based embodiments, the mobile device 122 or the workstation 128 performs a majority of the processing.

Figure 8:
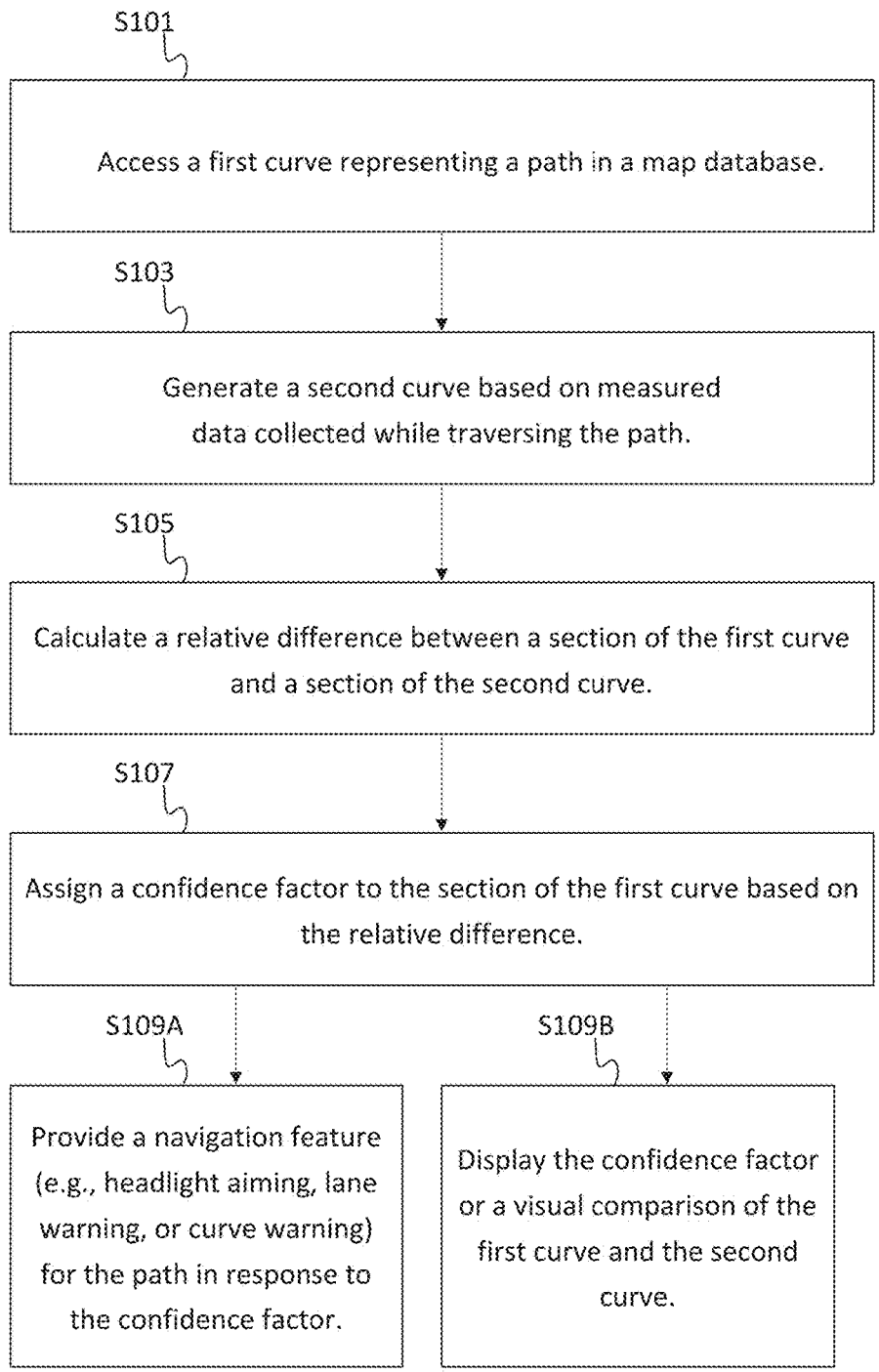
FIG. 8 illustrates another example flowchart for deriving path curve confidence factors.

FIG. 8 illustrates an example flowchart for calculating confidence factors for path curves, which is described in relation to the mobile device 122 but may be performed by another device. Additional, different, or fewer acts may be provided.

At act S101, the controller 200 accesses a first polycurve representing a path in a map database from the memory 204 or database 123. The first polycurve may be an ADAS curve that is continuous and allows positional and differential calculations at any point. The ADAS curve may be used to detect when a vehicle deviates from a road or lane and to predict upcoming curves or road conditions.

At act S103, the controller 200 generates a second polycurve based on measured data collected while traversing the path. The measured data may include position data, which may be combined with heading data or curvature data. In some areas, the first polycurve and the second polycurve may be identical. In other sections, the first and polycurve and the second polycurve deviate.

The polycurves are sectioned. Any size sectioning may be used. In one embodiment, the sections are fine enough such that each section includes curvature generally in one direction. Transition sections may have curvature in two or more directions. In other embodiments, the sections may be larger, such as including multiple changes in curvature.

At act S105, the controller 200 calculates a relative difference between a section of the first polycurve and a section of the second polycurve. The sections are matched up using a map matching technique. The section of the first polycurve corresponds geographically to the section of the second polycurve. The relative difference may be any combination of differences in position, heading, or curvature. The relative difference may have multiple components (e.g., latitude, longitude, and altitude) or in Cartesian (x, y, z).

At act S107, the controller 200 assigns a confidence factor to the section of the first polycurve based on the relative difference. The confidence factor may be binary (i.e., reliable or unreliable), continuous, e.g. ranging from 0 to 1, or the confidence factor may have a confidence score with three or more levels. The confidence factor may be calculated for subsequent sections of the polycurves.

At act S109A, the controller 200 provides a navigation feature for the path in response to the confidence factor. When the confidence factor exceeds a specific threshold, the navigation feature is enabled. When the confidence factor is less than the specific threshold, the navigation feature is disabled. Example navigation features include headlight aiming, lane warning, curve warnings or other driving assistance features dependent on the upcoming path. In one example, different confidence thresholds are used for the headlight aiming, lane warning, and curve warnings. The confidence threshold may be shown on display 211.

At act S109B, the controller 200 generates an image for display of the confidence factor. The display me be a visual comparison of the first curve and the second curve, as shown in FIGS. 4 and 5. The display of the confidence factor may be used to compare map databases or portions of map databases to identify quality or portions that need improvement (i.e., additional data collection). For example, a field vehicle may be routed to problem areas based on the comparison. Acts S109A and S109B may be performed together or in the alternative. The ADAS spline curve and confidence factors may be combined and offered to other developers as a data set. The visual comparison of the first curve and the second curve may be used to demonstrate the accuracy of the ADAS spline curve. The images for display, which may include confidence factors and/or graphical comparisons of path curves, may alternately be generated by the processor 300 and displayed on workstation 310 or transmitted to another device through network 127 (e.g., workstation 128).

Various navigation features provided by the controller 200 may be activated or modified according to the confidence score of the current location of the mobile device 122. When second polycurve is sufficiently aligned with the first polycurve, the controller 200 determines that the first polycurve is suitable for various navigation features. The confidence factor for one section is used to determine the navigation features to be provided in a subsequent section. The controller 200 may be configured to maintain a running average of confidence factors and disable or enable features based on the running average.

In one implementation, a weighting based on confidence factors rather than using thresholds may be used. For example, if a lane departure system uses both an onboard camera for tracking lane markings and our map database, the camera has inherent errors based on the road conditions, shape of the road, time of day, or other reasons. A second set of confidence factors may be derived from the camera data. The two sets of confidence factors may be combined or to obtain a combined confidence factor of the entire system. For example, a Khalman filter weights redundant sensor information (camera tracking or map data) based on the expected error or confidence of each sensors data to compute a final result.

Different navigation features may have different confidence thresholds. For example, a curve warning feature may be assigned a low confidence threshold because only a general indication of the magnitude of upcoming curves is needed. Adaptive headlight aiming may be assigned a medium confidence threshold because directing the headlights incorrectly may impair the driver's ability to see the road. Lane departure warning and control may be assigned a high confidence threshold because inaccurate steering controls may cause an accident.

The input device 203 is configured to receive a selection for defining the confidence ranges, minimum curvature threshold, confidence threshold, and correlation threshold. These values may be encoded in the ADAS system but configurable by the input device 203. The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The database 123 of the system 120 may be a geographic database. The geographic database 123 includes information about one or more geographic regions. Each road in the geographic region is composed of one or more road segments. A road segment represents a portion of the road. Each road segment is associated with two nodes (e.g., one node represents the point at one end of the road segment and the other node represents the point at the other end of the road segment) and may contain zero or more shape points to describe an approximate road shape in form of a polyline. The node at either end of a road segment may correspond to a location at which the road meets another road, i.e., an intersection, or where the road dead-ends. The road segment data may also include a continuous ADAS 2D and/or 3D curve representation of the road segment. The road segment data record may include data that indicate a speed limit or speed category (i.e., the maximum permitted vehicular speed of travel) on the represented road segment. The road segment data record may also include data that indicate a classification, such as a rank of a road segment that may correspond to its functional class. The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The navigation-related features may include a route calculation application. End users may access a route from an origin to a destination. The route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location. The at least one valid solution route may be displayed to the user in the rendering of the geographic region such that addresses or points of interest along the route may be selected to display street side imagery.

In one embodiment, the route calculation application may attempt to find a solution route that takes the least time to travel. The segment cost or travel time for the particular represented road segment considers the type of road, such as freeway or residential street, speed limit and distance of the segment. In one embodiment, the route calculation application may consider traffic conditions to more accurately reflect actual travel time over the connected road segments. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

The map-related features may be any of the navigation-related features provided to the user without reference to the current location of the user or the device. In addition, map-related features may include display and manipulation of a map of a geographic region. The map-related features may be provided without navigation-related features.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   obtaining, from a map database, a first spline representing a path, wherein the first spline is formed with piecewise polynomial functions and comprises a plurality of sections defined by at least one control point or at least one knot;
   generating a second spline based on measured position data collected from one or more sensors while traversing the path represented by the first spline, wherein the second spline is formed with piecewise polynomial functions and comprises a plurality of sections;
   performing, with a processor, an alignment between each section of the first spline and each section of the second spline, wherein the each section of the first spline corresponds geographically to the each section of the second spline;
   generating a plurality of confidence factors by comparing the each section of the first spline to the each corresponding section of the second spline;
   influencing at least one advanced driving system when the plurality of confidence factors meet or exceed a confidence threshold, wherein a plurality of advanced driving assist systems are assigned individual confidence thresholds and wherein the plurality of advanced driving assist systems are individually enabled or disabled when the plurality of confidence factors meet or exceed the corresponding confidence thresholds.

2. The method of claim 1, further comprising:
   displaying the confidence threshold.

3. The method of claim 1, wherein the plurality of confidence factors are generated by comparing a curvature of the each section of the first spline to a curvature of the each corresponding section of the second spline in succession.

4. The method of claim 1, wherein the measured position data is collected by at least one satellite based positioning sensor.

5. The method of claim 1, wherein the measured position data is collected by at least one inertial sensor.

6. The method of claim 1, further comprising:
   determining a correlation value for the plurality of sections of the first spline by calculating the differences between the plurality of sections of the second spline and the plurality of sections of the first spline, wherein the first spline corresponds to link geometry in the map database; and
   comparing the correlation value to a correlation threshold.

7. The method of claim 6, further comprising:
   excluding at least one of the plurality of sections of the first spline when the correlation value is less than the correlation threshold.

8. The method of claim 6, wherein the correlation value is based on shape, position, and/or heading.

9. The method of claim 1, wherein the at least one knot represents a point where the polynomial functions piece together; and
   wherein the at least one control point represents a point on a line segment that defines a shape of the first spline.

10. The method of claim 1, wherein the alignment between the section of the first spline and the section of the second spline is supplemented using heading data.

11. The method of claim 1, wherein the alignment between the each section of the first spline and the each corresponding section of the second spline is supplemented using shape data.

12. An apparatus comprising:
    at least one processor; and
    at least one non-transitory memory including computer program code for one or more programs; the at least one non-transitory memory and the computer program code configured to, with the at least one processor, cause the apparatus to at least:
    obtaining a first spline representing a path from a map database, wherein the first spline is formed with piecewise polynomial functions and comprises a plurality of sections defined by at least one control point or at least one knot;
    generating a second spline based on measured position data collected while traversing the path, wherein the second spline is formed with piecewise polynomial functions and comprises a plurality of sections;
    generating a plurality of confidence factors by comparing each section of the first spline to each section of the second spline; and
    activate or deactivate at least one advanced driving assist system if the plurality of confidence factors meet or exceed a confidence threshold.

13. The apparatus of claim 12, wherein the at least one control point defines a first polynomial and the at least one knot joins the first polynomial with a second polynomial.

14. The apparatus of claim 12, the at least one non-transitory memory and the computer program code configured to, with the at least one processor, cause the apparatus to at least:
performing an alignment between the each section of the first spline spanning a geographic distance and the each section of the second spline corresponding to the geographic distance, wherein the each section of the first spline corresponds geographically to the each section of the second spline.

15. A non-transitory computer readable medium including instructions that when executed by a processor are operable to:
access a first spline representing a path in a map database, wherein the first spline is formed with piecewise polynomial functions and comprises a plurality of sections defined by at least one control point or at least one knot;
generate a second spline based on measured data collected while traversing the path, wherein the second spline is formed with piecewise polynomial functions and comprises a plurality of sections;
align each section of the first spline spanning a geographic distance and each section of the second spline corresponding to the geographic distance, wherein the each section of the first spline corresponds geographically to the each section of the second spline;
assign a plurality of confidence factors by comparing the each section of the first spline to the each corresponding section of the second spline; and
activate or deactivate at least one advanced driving assist system if the plurality of confidence factors meet or exceed a confidence threshold.

16. The non-transitory computer readable medium of claim 15, wherein a plurality of advanced driving assist systems are assigned individual confidence thresholds; and
wherein the plurality of advanced driving assist systems are individually activated or deactivated when the plurality of confidence factors meet or exceed the corresponding confidence thresholds.

17. The non-transitory computer readable medium of claim 15, the instructions when executed by the processor are operable to:
determining a correlation value for the plurality of sections of the first spline by calculating the differences between the plurality of sections of the second spline and the plurality of sections of the first spline, wherein the first spline corresponds to link geometry in the map database;
comparing the correlation value to a correlation threshold; and
excluding at least one of the plurality of sections of the first spline when the correlation value is less than the correlation threshold.

18. The non-transitory computer readable medium of claim 15,
wherein the at least one knot represents a point where the polynomial functions piece together; and
wherein the at least one control point represents a point on a line segment that defines a shape of the first spline.

* * * * *